(12) United States Patent
Gao et al.

(10) Patent No.: US 8,281,585 B2
(45) Date of Patent: Oct. 9, 2012

(54) CONTROLLING HEAT TRANSFER IN ACTIVE MATERIAL ACTUATORS USING EXTERNAL ELEMENTS

(75) Inventors: Xiujie Gao, Troy, MI (US); Alan L. Browne, Grosse Pointe, MI (US); Nancy L. Johnson, Northville, MI (US); Nilesh D. Mankame, Ann Arbor, MI (US); Guillermo A. Herrera, Winnetka, CA (US); Geoffrey P. McKnight, Los Angeles, CA (US); Patrick B. Usoro, Troy, MI (US); Nicholas William Pinto, Ferndale, MI (US); Richard J. Skurkis, Lake Orion, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 685 days.

(21) Appl. No.: 12/437,768

(22) Filed: May 8, 2009

(65) Prior Publication Data
US 2009/0277170 A1  Nov. 12, 2009

Related U.S. Application Data

(60) Provisional application No. 61/051,351, filed on May 8, 2008.

(51) Int. Cl.
*F01B 29/10* (2006.01)
*F02G 1/04* (2006.01)
(52) U.S. Cl. ............................. 60/529; 60/527; 60/528
(58) Field of Classification Search ............. 60/527–529
See application file for complete search history.

(56) References Cited

U.S. PATENT DOCUMENTS

| | | | | |
|---|---|---|---|---|
| 2,810,290 A | * | 10/1957 | Scherer | 60/527 |
| 2,998,725 A | * | 9/1961 | Scherer | 60/527 |
| 4,325,217 A | * | 4/1982 | Golestaneh | 60/527 |

FOREIGN PATENT DOCUMENTS

| | | |
|---|---|---|
| EP | 0137502 A2 | 4/1985 |
| JP | 60-228778 A | 11/1985 |
| JP | 60-252172 A | 12/1985 |
| JP | 2001-173550 A | 6/2001 |
| JP | 2005-155427 A | 6/2005 |

* cited by examiner

*Primary Examiner* — Thomas Denion
*Assistant Examiner* — Christopher Jetton

(57) ABSTRACT

An actuator includes a thermally activated active material member, and an external element configured to selectively engage the member and presenting a predetermined rate of thermal conductivity configured to transfer heat energy to and/or from the member, so as to reduce the actuation period or rate of cooling after actuation, when engaged.

17 Claims, 2 Drawing Sheets

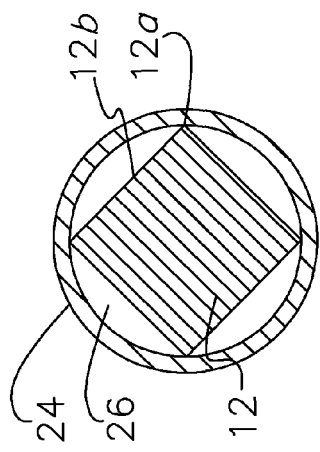
FIG. 1
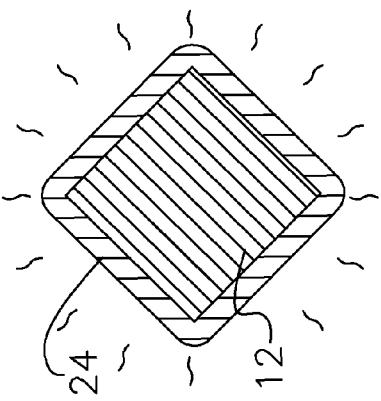
FIG. 1a
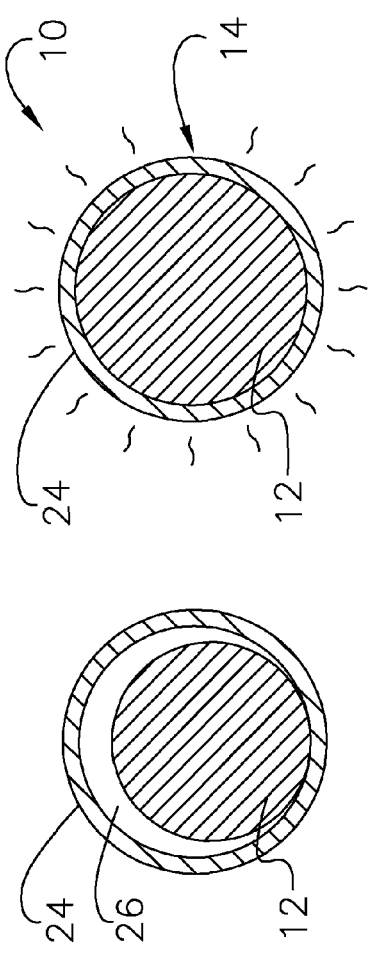
FIG. 1b
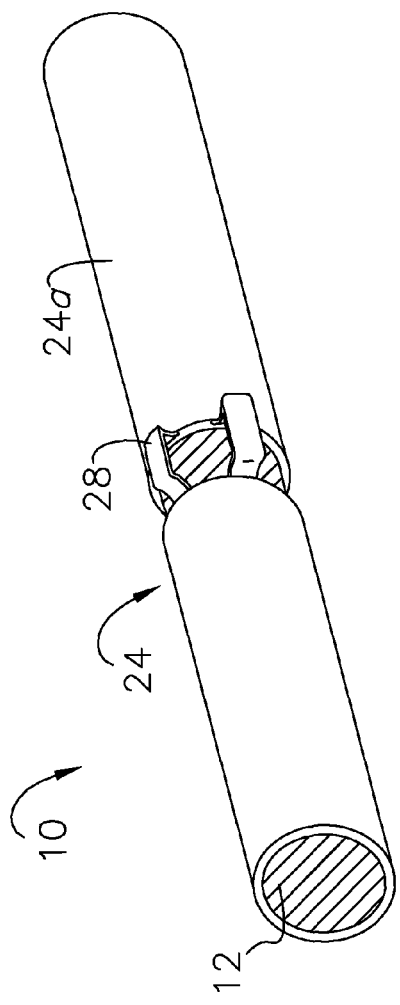
FIG. 2
FIG. 2a

CONTROLLING HEAT TRANSFER IN ACTIVE MATERIAL ACTUATORS USING EXTERNAL ELEMENTS

RELATED APPLICATIONS

This patent application makes reference to, claims priority to, and claims benefit from U.S. Provisional Patent Application Ser. No. 61/051,351, entitled "CONTROL METHODS FOR SMA ACTUATORS," filed on May 8, 2008, the disclosure of which being incorporated by reference herein.

BACKGROUND OF THE INVENTION

1. Field of the Invention

The present disclosure generally relates to methods of controlling thermally activated active material actuators, and more particularly, to a method of controlling heat transfer within the actuator utilizing external elements.

2. Discussion of Prior Art

Thermally activated active material actuators, such as shape memory alloy (SMA) actuators in the Martensitic state, are activated by heating the material to a temperature that is above a prescribed value. With respect to SMA, this causes the material to undergo phase transformation from a Martensitic to an Austenitic state, wherein it contracts and in the process is used to do work. SMA wires, for example, are resistively heated by applying an electrical current there through. Once activated, the actuator must undergo a cooling period prior to being re-actuated. Concerns with this approach include limiting the actuation period, so as to provide more instantaneous actuation, and, limiting the cooling period, which further aids in preventing overheating. Moreover, it is appreciated that extended actuation and cooling periods can cause reduced system response bandwidth, whereas overheating can cause damage to the actuator. It is therefore desirable to have an effective means of accelerating actuation and cooling, so as to streamline actuation and prevent overheating over the life of the actuator.

BRIEF SUMMARY OF THE INVENTION

The present invention addresses these concerns by providing novel shape memory alloy actuator configurations that utilize external elements to reduce the actuation period and/or accelerate cooling time over a thermal activation cycle. The invention is useful, among other things, for reducing bandwidth, and preventing overheating during a thermal actuation cycle. As such, the invention is useful for effecting more efficient operation, and for protecting the integrity of the SMA actuator and device or machine driven thereby.

In a first aspect of the invention, a thermally activated active material actuator is adapted to reduce cooling time as previously described. The actuator includes an active material member operable to undergo a reversible change in fundamental property when exposed to or occluded from a thermal activation signal, so as to be activated and deactivated respectively. The element presents a first cross-sectional area when deactivated and a second cross-sectional area greater than the first when activated. Inventively, the actuator further includes an exterior sheath presenting a predetermined thermal conductivity designed to accelerate cooling conductively. The sheath defines an interior space presenting a third cross-sectional area greater than the first, and generally not greater than the second. Finally, the element is disposed within the space.

In a second aspect of the invention, the actuator is adapted to reduce actuation time. Here the actuator includes an active material member presenting an exterior surface, and an external fluid engaged with the surface and thermally coupled to a heating source operable to heat the fluid, and thereby the element to a target temperature prior to exposing the element to the activation signal.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1 is a cross-section of a shape memory alloy actuator including a sheath defining an interior space presenting a first cross-sectional area, and an SMA wire disposed within the space and presenting a second cross-sectional area less than the first, in accordance with a preferred embodiment of the invention;

FIG. 1a is a cross-section of the actuator shown in FIG. 1, wherein the wire has been activated, particularly illustrating the wire having an enlarged third cross-sectional area at least equal to the first;

FIG. 1b is a perspective view of the actuator shown in FIG. 1, including a segmented sheath comprising a plurality of segments interconnected and spaced by a plurality of flexible ribs, in accordance with a preferred embodiment of the invention;

FIG. 2 is a cross-section of a shape memory alloy actuator including a flexible sheath defining an interior space presenting a first cross-sectional area, and an SMA wire disposed within the space and presenting a second cross-sectional area less than the first, and of polygonal configuration, such that the wire contacts the sheath only along the corners thereof, in accordance with a preferred embodiment of the invention;

FIG. 2a is a cross-section of the actuator shown in FIG. 2, wherein the wire has been activated, particularly illustrating the wire having an enlarged third cross-sectional area at least equal to the first, such that the sheath is caused to conform to the shape of the wire;

DETAILED DESCRIPTION OF THE INVENTION

As illustrated in FIGS. 1-4, various embodiments of a novel actuator 10 including a thermally activated active material member (e.g., wire) 12 and an external element 14 operable to reduce the actuation and/or cooling period of the wire 12 is presented herein. That is to say, the external element 14 produces a predetermined thermal conductivity that when compared to the rate of thermal heat transfer to and from the surrounding space, reduces the actuation period and/or accelerates the rate of cooling. More preferably, the external element 14 is operable to reduce the actuation period and/or accelerate the rate of cooling by at least 10%, and most preferably by at least 25%. Though described herein with particular respect to SMA, it is within the ambit of the invention to utilize the benefits of the disclosure with other thermally activated active materials, such as shape memory polymer (SMP). The following description of the preferred embodiments is merely exemplary in nature and is in no way intended to limit the invention, its application, or uses.

Figure 3:
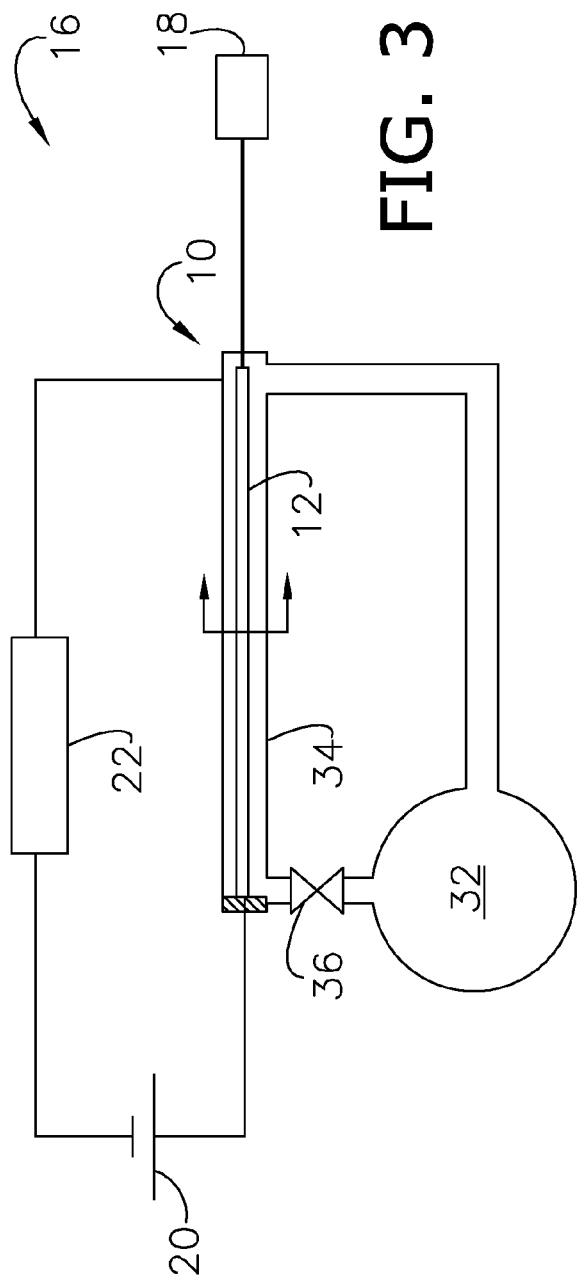
FIG. 3 is a diagram of a system including a shape memory alloy actuator, a source thermally engaged to the actuator, and a conduit encasing the actuator and fluidly coupled to the source, in accordance with a preferred embodiment of the invention.
Figure 3A:
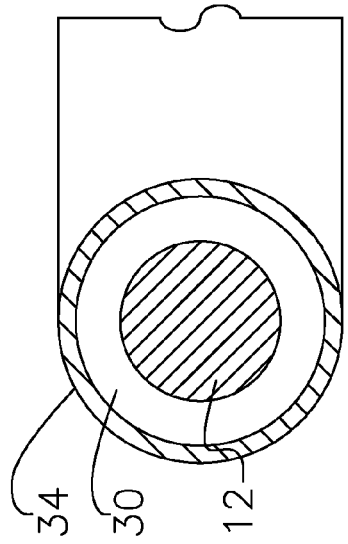
FIG. 3a is a cross-section of the actuator and conduit shown in FIG. 3.

In FIG. 3, a system 16 is adapted for use with the actuator wire 12, which is drivenly coupled to a load 18 and operable to perform useful mechanical work. The system 16 further includes a power supply 20 operable to deliver an activation signal to the wire 12. Finally, a controller 22 is communicatively coupled to the supply 20 and wire 12 and configured to cause the actuator 10 to drive the load 18 when desired. As used herein the term "wire" is non-limiting, and shall include other similar geometric configurations presenting tensile load strength/strain capabilities, such as cables, bundles, braids, ropes, strips, chains, and other elements to the extent compatible with the geometric limitations of the present invention.

As used herein, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

In typical use, SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state.

Returning to the present invention, FIG. 1 presents a first exemplary embodiment, wherein the external element 14 is a sheath 24 configured to selectively engage and draw heat energy from the active material member (e.g., wire) 12. More particularly, where the wire 12 presents a first cross-sectional area when deactivated and a second cross-sectional area greater than the first when activated, the sheath 24 defines an interior space 26 presenting a third cross-sectional area greater than the first, and generally not greater than the second. More preferably, the third area is not less than 125% of the first.

The wire 12 is disposed within the space 26. As such, in a normally deactivated state the wire 12 minimally contacts the sheath 24 ideally along a tangential line defined by the two circular cross-sections (FIG. 1). When activated, the wire radially expands, so as to fill the space 26 and substantially increase the contact area of engagement between the wire 12 and sheath 24 (FIG. 1a). By doing so, the wire 12 is able to transfer heat energy at an otherwise accelerated rate of cooling, due to the increased thermal heat transfer rate offered by the sheath 24. That is to say, when engaged, the sheath 22 produces a rate of cooling through conduction that is greater than the rate of cooling offered by ambient conditions.

The sheath 24 is therefore configured to present a thermal conductivity (i.e., heat transfer coefficient) substantially greater than 0.024 W/mK (the conductivity of air). For example, the sheath 24 may be formed of copper (e.g., copper alloys), or aluminum (e.g., aluminum alloys), which present thermal conductivities of approximately 400 and 250 W/mK, respectively. As shown in FIG. 1b, the preferred sheath 24 is longitudinally segmented, so as to enable continued longitudinal expansion/contraction of the wire 12 without friction loss, when engaged. Here, the segments 24a may be interconnected by a plurality of flexible ribs 28 (FIG. 1b) to maintaining proper spacing.

The preferred sheath 24 is also stretchable, so that the third area may be less than the second. Here, when the wire 12 is activated, the sheath 24 and wire 12 will generally present radially superjacent layers, which maximizes the contact area of engagement. The sheath 24 may present an integrally stretchable body, or may consist of longitudinal membranes (not shown) that elastically interconnect the emissive sectors. In another alternative, where the sheath 24 is flexible, the wire 12 may present a polygonal cross-sectional shape defining corners 12a and an exterior surface 12b (FIG. 2). Here, the first, second, and third areas are cooperatively configured such that only the corners 12a of the polygon contact the sheath 24 when the wire 12 is in the normally deactivated state, and the sheath 24 is caused to conform to, so as to define superjacent layers with, the surface 12b, when the wire 12 is activated.

In a second aspect of the invention, the external element 14 is a fluid 30 configured to selectively engage the surface 12b. The fluid 30 is thermally coupled to a source 32 operable to heat and/or cool the fluid 30, and thereby the wire 12 to a target temperature. That is to say, the source 32 may heat the wire 12 prior to exposing it to the activation signal, so as to "prime" the wire 12 and reduce the actuation period; and/or cool the wire 12 after exposing it to the signal, so as to accelerate the rate of cooling. In an automotive setting for example, the source 32 may be the engine or cooling system of the vehicle (not shown). With respect to the former, it is appreciated that the source 32 will generate heated ambient air during normal operation. By selectively exposing the wire 12 to the heated air, priming can be achieved. By switching between interaction with the hot and cold side of the cooling system, the wire 12 may be heated and cooled by the cooling system, respectively.

Alternatively, the wire 12 may be interiorly disposed within a conduit 34 fluidly coupled to the source 32, as shown in FIG. 3. The fluid 30 flows within and is preferably hermetically sealed by the conduit 34 and source 32, except for the driving rod and electrical contacts, which are protected from the fluid. Again, where the source 32 is a vehicular engine, the conduit 34 may be configured to direct airflow from the engine and to the wire 12, so that wire priming is a by-product of the normal operation of the engine. A valve 36 may be provided, such that the wire 12 is selectively exposable to the airflow.

Figure 4:
FIG. 4 is a cross-section of a shape memory alloy actuator having an exterior layer of material presenting a heat of fusion or vaporization with a target temperature range relative, in accordance with a preferred embodiment of the invention.

Finally, in a third example shown at FIG. 4, the external element 14 is a layer of material 38 thermally coupled, and more preferably, directly engaging the wire surface 12b. The layer 38 presents a melting or vaporization point greater than the Austenite finish temperature of the wire 12, and less than a predetermined percentage of the temperature, so as to be melted or vaporized when the wire 12 is caused to produce an excess of heat energy. More preferably, the percentage is not more than 125%, and most preferably, 110%, so as to ensure quick response, and minimize the heat excess and required material.

The layer 38 presents a heat of fusion (i.e., enthalpy of fusion) or vaporization operable to remove the excess heat. For example, the layer 38 may present a heat of fusion between 100-300 J/g, and, as such, a suitable material for use herein is paraffin wax. Also shown in FIG. 4 is a collector sheath 40 that exteriorly contains the layer 38 of material in the molten or vaporized state, until releasing its energy and re-solidifying or liquefying. To that end, the sheath 40 again presents a minimum thermal conductivity not less than that of the wire 12, so as to draw heat energy from the wire 12 and layer 38. More preferably, the collector sheath 40 presents a thermal conductivity greater than 150%, and most preferably 200% of the thermal conductivity of the wire 12.

In another aspect of the invention, it is appreciated that the increased cooling rates may be used to apply a return signal after actuation to the wire 12, so as to slow the return of the actuator 12, without sacrificing bandwidth, as opposed to the previous embodiments that reduce bandwidth. The return signal applied can be modified to effect consistent return over varying conditions.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. A thermally activated active material actuator comprising:
an active material member operable to undergo a reversible change in fundamental property when exposed to or occluded from a thermal activation signal, so as to be activated over an actuation period, and deactivated respectively, and presenting an ambient rate of cooling after being activated; and
an external element presenting a predetermined thermal conductivity, and configured to selectively engage the member, so as to reduce the period and/or accelerate the rate,
wherein the shape memory alloy member presents a first cross-sectional area when deactivated and a second cross-sectional area greater than the first when activated, the external element is an exterior sheath defining an interior space presenting a third cross-sectional area greater than the first, and less than or equal to the second, and the SMA member is disposed within the space.

2. The actuator as claimed in claim 1, wherein the member is a shape memory alloy wire.

3. The actuator as claimed in claim 1, wherein the rate of cooling is accelerated by at least 10%.

4. The actuator as claimed in claim 1, wherein the rate of cooling is accelerated by at least 25%.

5. The actuator as claimed in claim 1, wherein the third area is not less than 125% of the first.

6. The actuator as claimed in claim 1, wherein the third area is less than the second, and the sheath is stretchable, so as to present radially superjacent layers when the member is activated.

7. The actuator as claimed in claim 1, wherein the sheath is flexible, the member presents a polygonal cross-sectional shape defining corners and an exterior surface, and the first, second, and third areas are cooperatively configured such that only the corners of the polygon contact the sheath when the member is deactivated, and the sheath and surface present superjacent layers when the member is activated.

8. The actuator as claimed in claim 1, wherein the thermal conductivity is not less than 500% of the thermal conductivity of air.

9. The actuator as claimed in claim 8, wherein the sheath is comprised of materials selected from the group consisting essentially of copper, copper alloys, aluminum, and aluminum alloys.

10. The actuator as claimed in claim 1, wherein the sheath is longitudinally segmented.

11. The actuator as claimed in claim 1, wherein the SMA member presents an exterior surface, and the external element includes a fluid engaged with the surface and thermally coupled to a source operable to heat and/or cool the fluid, and thereby the member to a target temperature prior to exposing the member to the signal, so as to reduce the period and/or after exposing the member to the signal, so as to accelerate the rate.

12. The actuator as claimed in claim 11, wherein the member is interiorly disposed within a conduit fluidly coupled to the source, and the fluid flows within the conduit and source.

13. The actuator as claimed in claim 11, wherein the source is a vehicular engine, the fluid is airflow from the engine, and the member is selectively exposable to the airflow.

14. The actuator as claimed in claim 1, wherein the shape memory alloy member presents an exterior surface and an Austenite finish temperature, the external element includes a layer of material thermally coupled to the shape memory alloy member, and the layer presents a melting or vaporization point greater than the finish temperature and less than a predetermined percentage of the temperature, so as to be melted or vaporized when the member is caused to produce an excess of heat energy, and a heat of fusion or vaporization operable to remove the excess.

15. The actuator as claimed in claim 14, wherein the percentage is not more than 110%.

16. The actuator as claimed in claim 15, wherein the material is paraffin wax.

17. The actuator as claimed in claim 14, further comprising a collector sheath exterior to the layer, the member presents a first thermal conductivity, and the sheath presents a second conductivity greater than 150% of the first, so as to draw heat energy from the member and layer.

* * * * *